US012602014B2

(12) United States Patent
Peng

(10) Patent No.: US 12,602,014 B2
(45) Date of Patent: Apr. 14, 2026

(54) WATCHCASE WITH DETACHABLE BEZEL AND WATCH THEREOF

(71) Applicant: Dongguan Aite Precision Hardware Parts Co., Ltd., Dongguan (CN)

(72) Inventor: Shuping Peng, Dongguan (CN)

(73) Assignee: DONGGUAN AITE PRECISION HARDWARE PARTS CO., LTD., Dongguan (CN)

( * ) Notice: Subject to any disclaimer, the term of this patent is extended or adjusted under 35 U.S.C. 154(b) by 319 days.

(21) Appl. No.: 18/333,518

(22) Filed: Jun. 12, 2023

(65) Prior Publication Data

US 2024/0126211 A1 Apr. 18, 2024

(30) Foreign Application Priority Data

Oct. 13, 2022 (CN) ........................ 202211253442.8

(51) Int. Cl.
*G04B 47/04* (2006.01)

(52) U.S. Cl.
CPC .................................. *G04B 47/046* (2013.01)

(58) Field of Classification Search
CPC ... G04B 47/046; G04B 3/041; G04B 37/0427
See application file for complete search history.

(56) References Cited

U.S. PATENT DOCUMENTS 1,802,080 A * 4/1931 Jandoc ................ G04B 37/086 368/291
3,264,820 A * 8/1966 Piquerez .............. G04B 37/084 368/291
4,034,552 A * 7/1977 Davidson ........... G04B 37/1486 63/3
4,594,008 A * 6/1986 Affolter ................. G04B 39/02 968/301
11,604,436 B2 * 3/2023 Junod .................. G04B 37/052
2006/0114753 A1 * 6/2006 Gerber ................. G04B 19/283 368/295
2008/0117723 A1 * 5/2008 Hiranuma ............ G04B 19/283 368/294
2019/0049901 A1 * 2/2019 Raffy ................. G04B 37/1426
2020/0206439 A1 * 7/2020 Klurfeld ................. A24F 40/40
2020/0387113 A1 * 12/2020 Neighbors ........... G04B 19/283
2021/0116868 A1 * 4/2021 Ehrsam ................ G04B 19/286

* cited by examiner

*Primary Examiner* — Sean Kayes
(74) *Attorney, Agent, or Firm* — HOWARD M COHN and Associates, LLC

(57) ABSTRACT

A watchcase with a detachable bezel and a watch thereof are provided. The bezel is detachably installed on an upper end of the watchcase, the watchcase including at least two clamping members, and the bezel including at least two slots corresponding to engage with the at least two clamping members, each of the at least two clamping members including a clamping portion, an elastic member applied to lock the clamping portion in the corresponding slot, and an operation member connected to the clamping portion and controlling the clamping portion to move so as to the clamping portion detach from the slot. The improved bezel can detachably connect to the watchcase by the clamping member, which is highly applicable without being limited to circular watchcases, so that irregular watchcases such as square watchcases and barrel-shaped watchcases can also be used without needing other tools to disassembly and assembly the watchcase.

8 Claims, 8 Drawing Sheets

WATCHCASE WITH DETACHABLE BEZEL AND WATCH THEREOF

BACKGROUND

1. Technical Field

The present disclosure generally relates to the field of watches, and especially relates to a watchcase with a detachable bezel and a watch thereof.

2. Description of Related Art

With a progress of the times, watches are no longer just a tool for observing time, but more often become an accessory or a symbol of identity. In order to meet ever-changing needs of users, there have been watches in the market that have interchangeable bezels of watchcases. Users can change different bezels according to attendance occasions, clothing, or mood. A conventional watch of this type usually disassembles and assembles a bezel and a watchcase by using a rotating structure, which has significant limitations and is only suitable for the watchcase with a circular window in the middle thereof. In addition, in order to prevent the bezel from loosening, a twisting force applied on the rotating structure is generally large, which is difficult to disassembly and assembly the bezel and the watchcase, and unsuitable for daily high-frequency changing the bezel. In summary, there needs to improve the conventional watchcase with such detachable bezel.

SUMMARY

The technical problems to be solved: in view of the shortcomings of the related art, the present disclosure provides an improved watchcase with a detachable bezel which can have wide applicability and be convenient to disassembly and assembly.

The technical solution adopted for solving technical problems of the present disclosure is: a watchcase with a detachable bezel according to an embodiment of the present disclosure includes: the bezel detachably installed on an upper end of the watchcase, the watchcase including at least two clamping members, and the bezel including at least two slots corresponding to engage with the at least two clamping members, each of the at least two clamping members including a clamping portion, an elastic member applied to lock the clamping portion in the corresponding slot, and an operation member connected to the clamping portion and controlling the clamping portion to move so as to detach the clamping portion from the slot.

Wherein the operation member of one of the at least two clamping members includes a movable key installed in a receiving room that is arranged on a side wall of the watchcase, an operation window arranged on an outer end of the receiving room so that the key passes through the receiving room and extends out of the watchcase, a lower portion of the clamping portion connected to the key, and an upper portion of the clamping portion extending upwards to fit with the slot, the elastic member arranged between the key and the receiving room.

Wherein the receiving room includes an upper side with a through-hole thereof, the clamping portion passing through the through-hole, and the through-hole having a space to adapt to a movement of the clamping portion.

Wherein the key is pressed inwards to be installed in the receiving room and includes an insertion chamber, one end of the elastic member inserted into the insertion chamber, and the other end of the elastic member extending out of the insertion chamber and abut against an inner wall of the receiving room; the slot corresponding to the clamping member horizontally arranged on a bottom surface of the bezel, an outer portion of the slot taken as a locking end, and an inner portion of the slot taken as an unlocking end; and the watchcase including a vertical limiting rod and a limiting hole arranged on the key, the limiting rod inserted into the limiting hole, and the limiting hole defining a headspace to move the limiting rod therein, so as to adapt to a pressing action of the key.

Wherein the watchcase includes a crown, and the receiving room arranged above the crown; and the key including a knob, and a base received in the receiving room, the clamping portion arranged on the base; the knob exposed through the operation window, and a connecting portion between the knob and the base being in a bent-shaped structure, and the crown arranged below the connecting portion.

Wherein an extension direction of the locking end and the unlocking end of the slot is consistent with a length direction of a side of the bezel, and a movement direction of the key is consistent with the length direction of a side edge of the watchcase; and the elastic member supported between an end portion of the key and a corresponding end wall of the receiving room.

Wherein the operating member of one of the at least two clamping members includes the crown and a corresponding slide block; a sliding chamber formed at a side wall of the watchcase, and the slide block installed in the sliding chamber, the lower portion of the clamping portion connected to the slide block, and the upper portion of the clamping portion extending upwards to fit with the corresponding slot; and the slide block pushed inwards to be unlocked by pressing the crown, and the elastic member arranged between an inner wall of the slide block and an inner wall of the sliding chamber.

Wherein the crown includes a seat installed on the watchcase, and a hat covered at the outer of the seat and moving axially relative to the seat, the hat including a triggering portion corresponding to the slide block.

Wherein the seat includes an inner chamber axially penetrating the seat; the inner wall of the hat connected to a tubular portion penetrating through the inner chamber, and an end of the tubular portion that is away from the ha connected to a handle; and a spring received in the tubular portion, and both ends of the spring respectively abut against the hat and the handle.

Wherein a marble is installed on the watchcase to abut against a bottom surface of the bezel.

A watch according to an embodiment of the present disclosure includes a watchcase with a detachable bezel as described in the above contents.

The present disclosure provides the advantages as below: the improved bezel can detachably connect to the watchcase by the clamping member, which is highly applicable without being limited to circular watchcases, so that irregular watchcases such as square watchcases and barrel-shaped watchcases can also be used without needing other tools to disassembly and assembly the watchcase.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. The same reference numerals in the accompanying drawings indicate the same or similar components or parts, one of ordinary skill in the related art should understand that these drawings are not necessarily drawn to scale.

Figure 1:
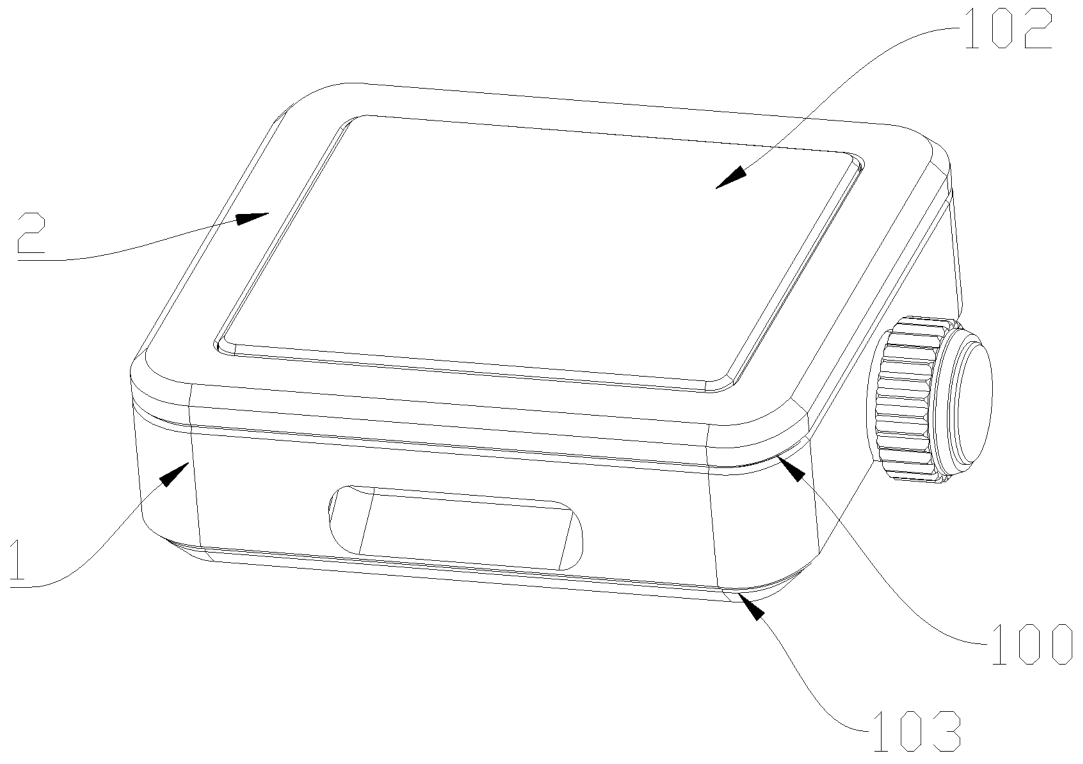
FIG. 1 is a schematic view of a watchcase with a detachable bezel in accordance with an embodiment of the present disclosure.

The element labels according to the embodiment of the present disclosure shown as below:

1 watchcase, 100 upper end, 101 top cover, 102 bottom cover, 103 marble, 104 side wall, 105 side edge, 2 bezel, 200 bottom surface, 201 side, 3 slot, 30 outer portion, 31 inner portion, 4 clamp member, 5 receiving room, 50 operation window, 51 outer end, 52 upper side, 53 inner wall, 54 end wall, 6 operation member, 60 key, 600 knob, 601 base, 602 connecting portion, 603 insertion chamber, 604 limiting hole, 6041 headspace, 605 end portion, 61 crown, 610 triggering portion, 611 hat, 62 slide block, 63 seat, 630 inner chamber, 64 tubular portion, 65, handle, 66 first flange, 660 second flange, 67 spring, 7 clamping portion, 70 lower portion, 71 upper portion, 8 elastic member, 9 through-hole, 90 space, 10 sliding chamber, 100 window, 11 limiting rod.

DETAILED DESCRIPTION

In order to more clearly understand the technical solution hereinafter in embodiments of the present disclosure, reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples.

According to the described embodiment of the present disclosure, all other embodiments obtained by one of ordinary skill in the related art without the need for a creative labor are within the protection scope of the present disclosure. Unless defined otherwise, the technical terms or scientific terms used for the present disclosure shall be a general meaning commonly understood by those having ordinary skill in the related art to which the present disclosure is applied.

In the description of the present disclosure, it needs to be understood that the terms mentioned below: the terms such as "first" and "second" shown in the specification are only used to describe, but not indicated that the elements of the present disclosure is important or represented the amount of the elements. That is, the features limited by the terms of "first" and "second" may explicitly or implicitly include one or more features. Similar, in the description of the present disclosure, the meaning of the term "one", "a" and "the" don't indicate a quantitative limit, but indicate that it includes at least one unless it is specifically illustrated. Furthermore, the terms such as "include", "including", "comprising" and "comprise" and the like means that elements or items in front of such term is intended to cover the elements or objects appeared the list behind the term and its equivalent, without excluding other elements or items. In the description of the present disclosure, except where specifically otherwise illustrated or limited, the terms "install", "connect", "link" and "fix" used herein should be understood in a broad perceive. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure. In addition, the terms such as "upper", "below", "left", and "right", etc, are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

Figure 2:
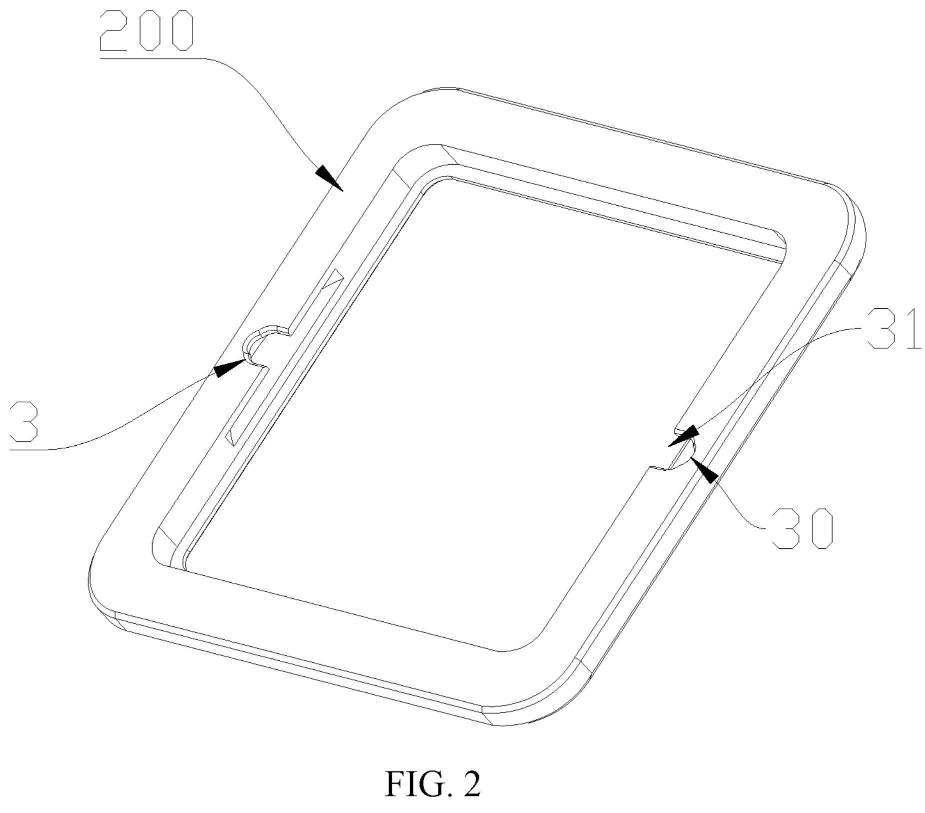
FIG. 2 is a bottom schematic view of the bezel of the watchcase according to an embodiment of the present disclosure.
Figure 3:
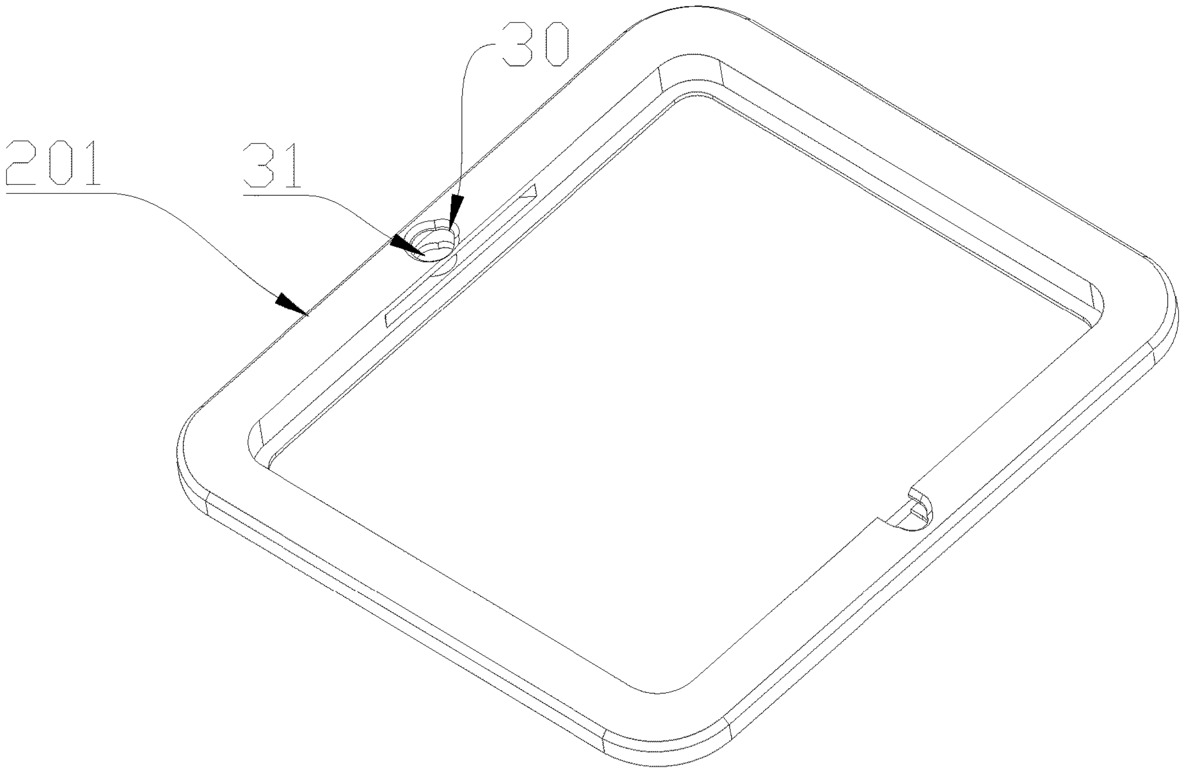
FIG. 3 is a bottom schematic view of the bezel of the watchcase according to another embodiment of the present disclosure.
Figure 4:
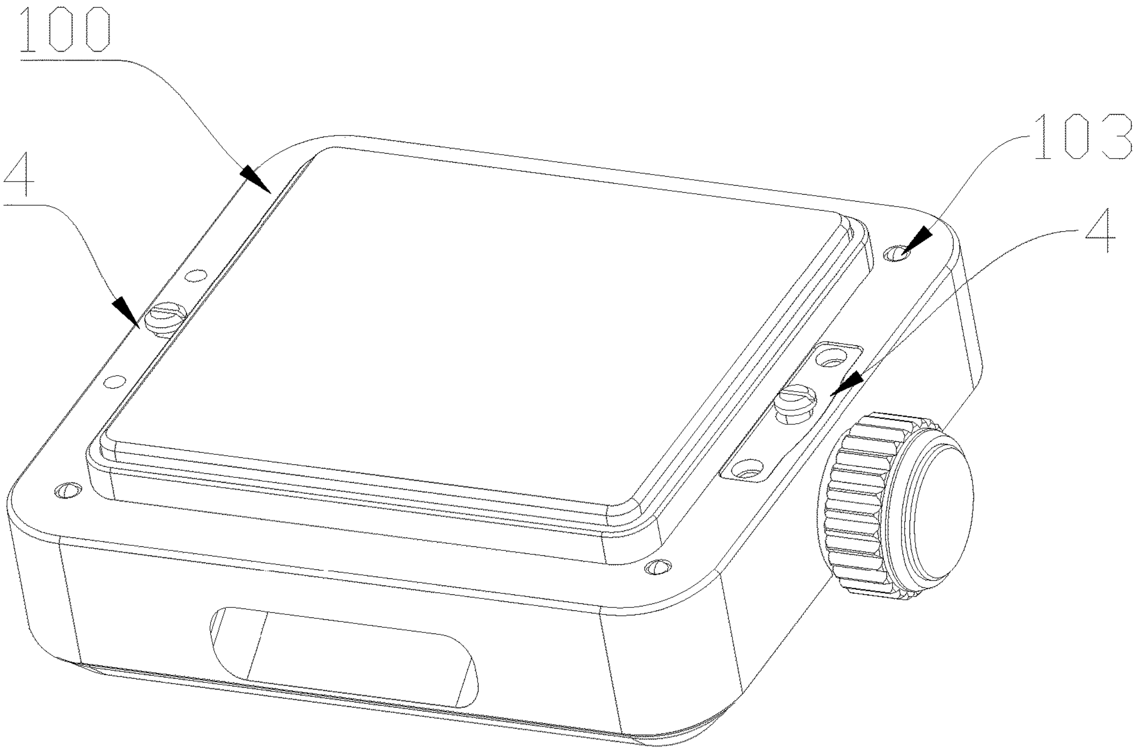
FIG. 4 is a schematic view of a clamp member assembled on the watchcase of FIG. 1.
Figure 5:
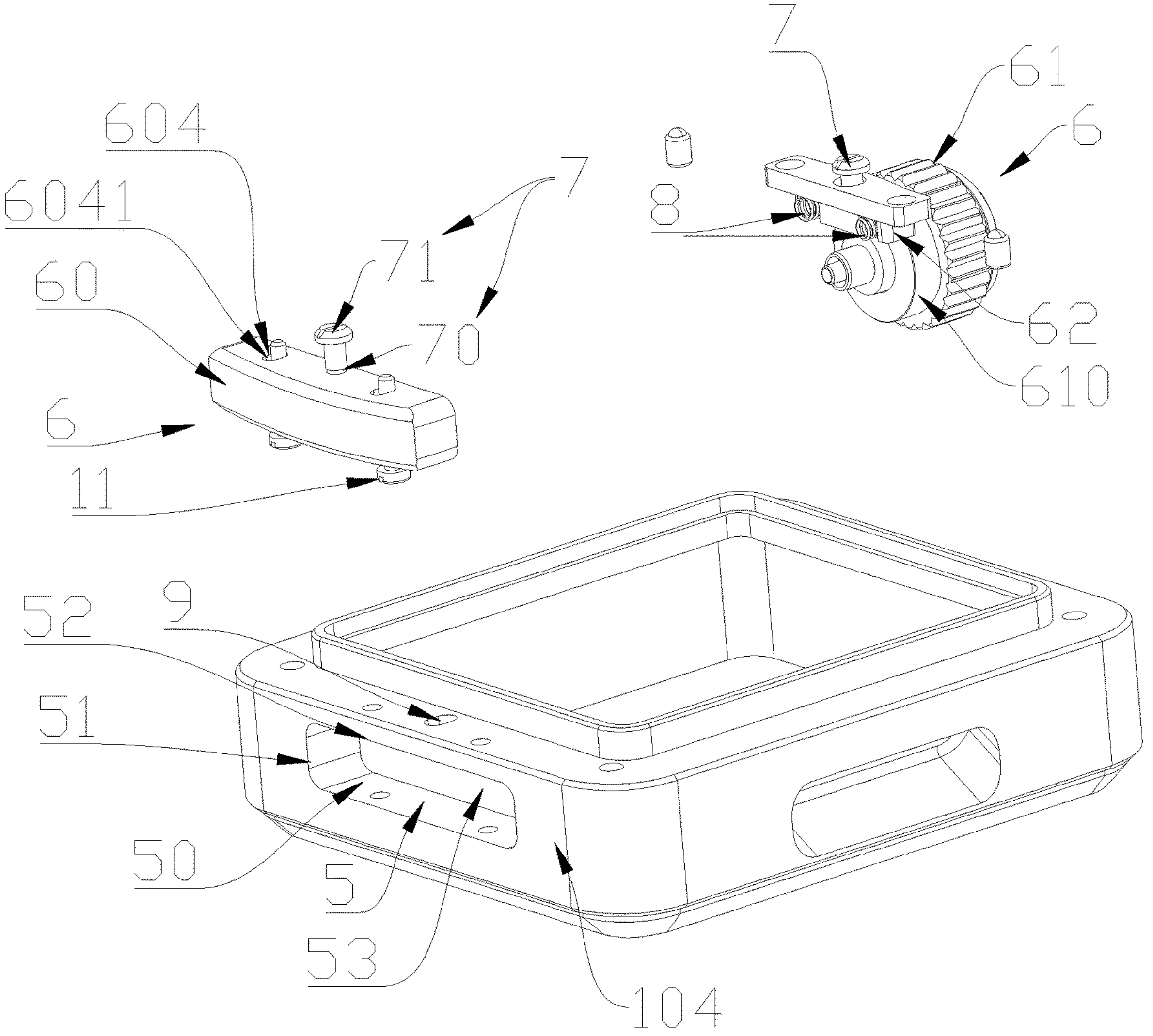
FIG. 5 is an exploded, schematic view of the clamp member of FIG. 1.
Figure 6:
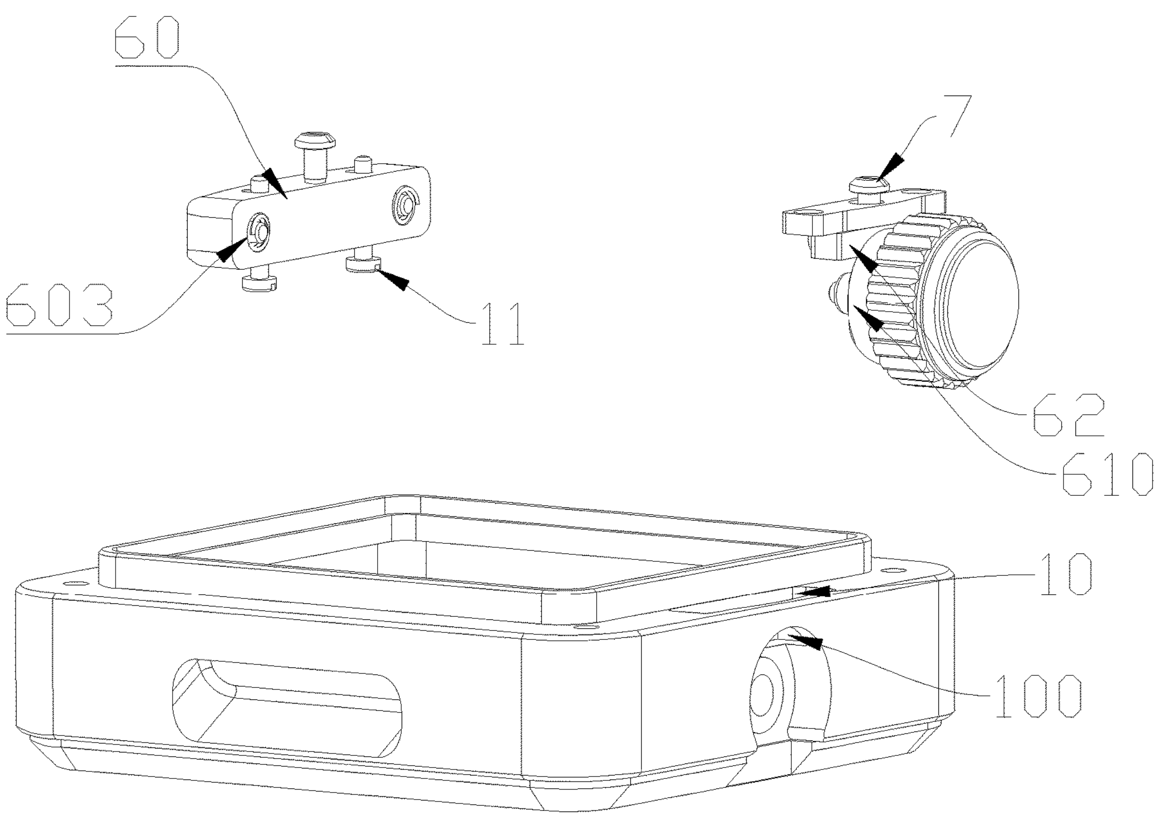
FIG. 6 is similar to FIG. 5, but shown from another view.
Figure 7:
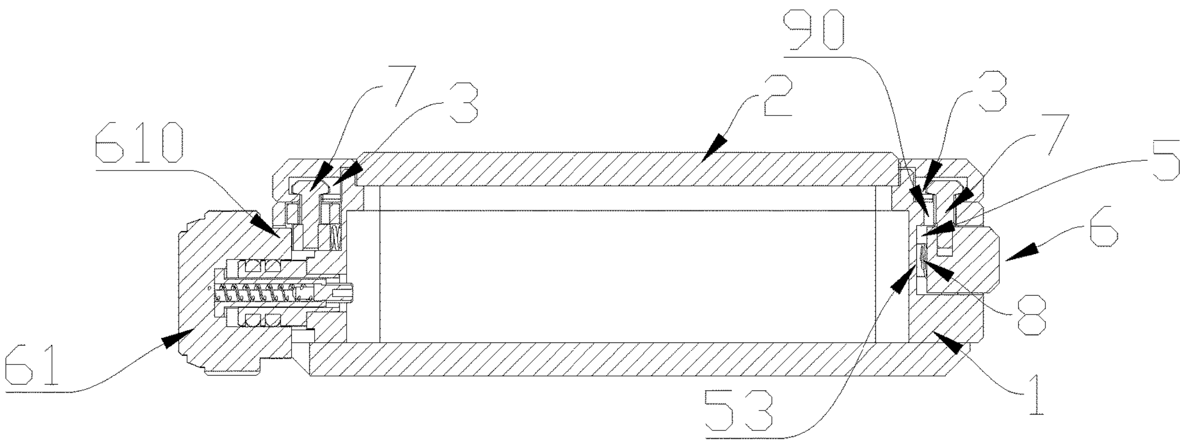
FIG. 7 is a cross-sectional view of the watchcase of FIG. 1.
Figure 8:
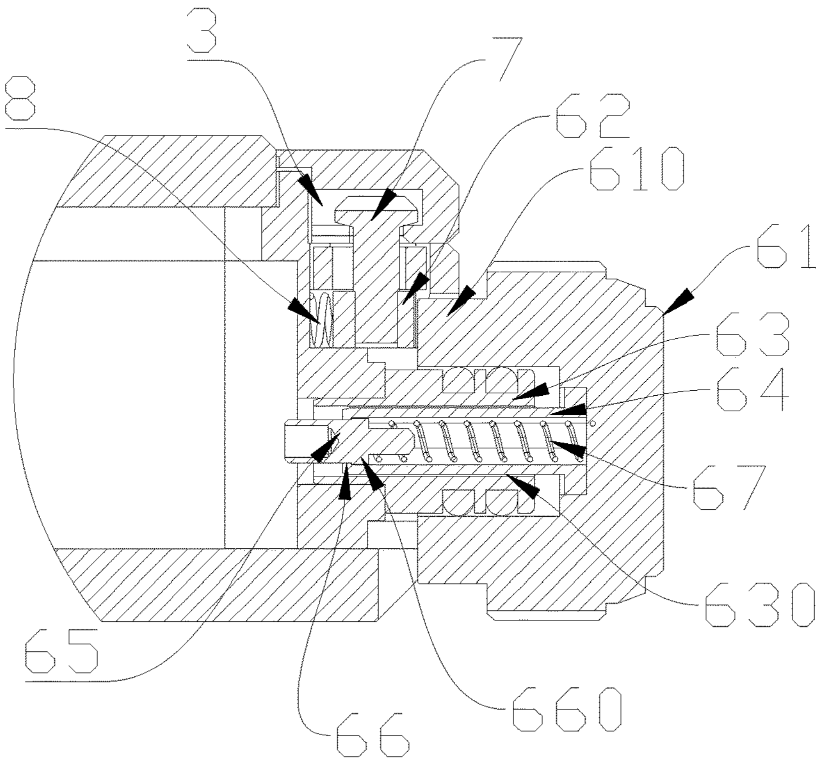
FIG. 8 is a cross-sectional view of the clamp member and a crown of the watchcase of FIG. 1.
Figure 9:
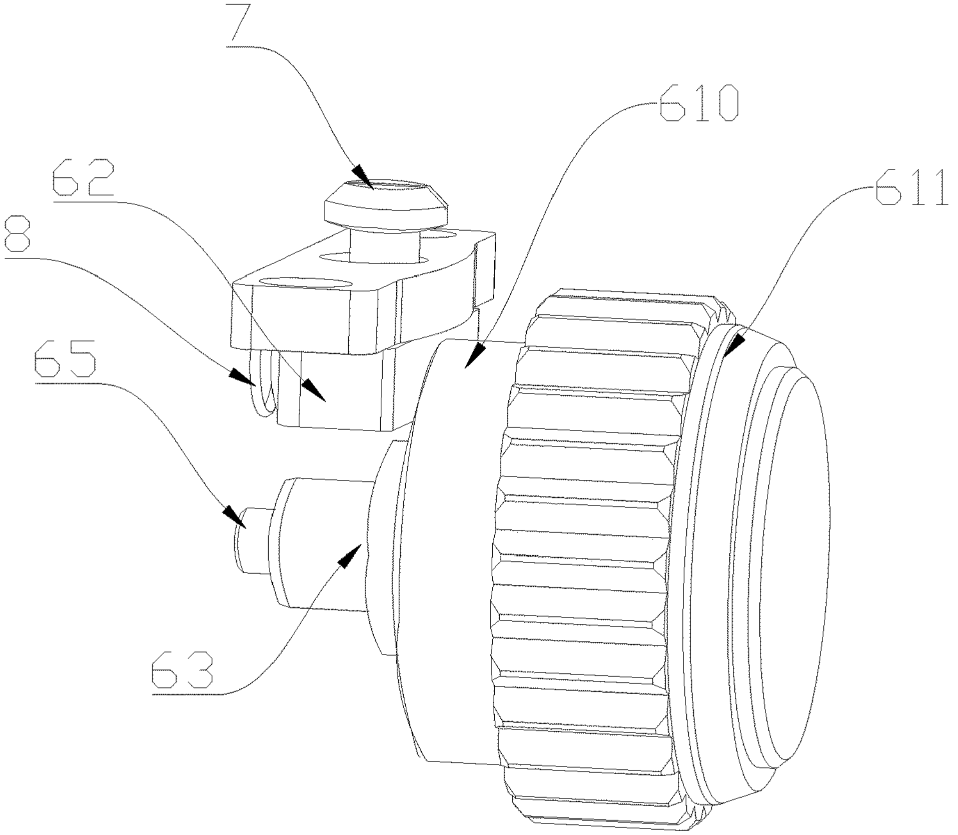
FIG. 9 is an assembly schematic view of the crown and a slide block of the watchcase of FIG. 1.
Figure 10:
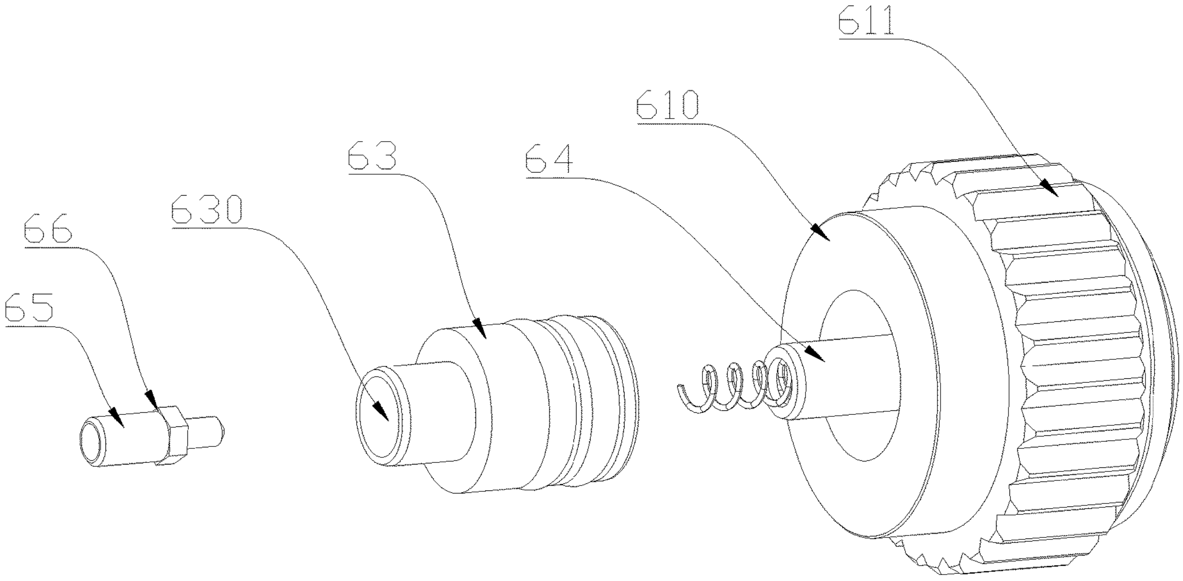
FIG. 10 is an exploded, schematic view of the crown of the watchcase of FIG. 1.
Figure 11:
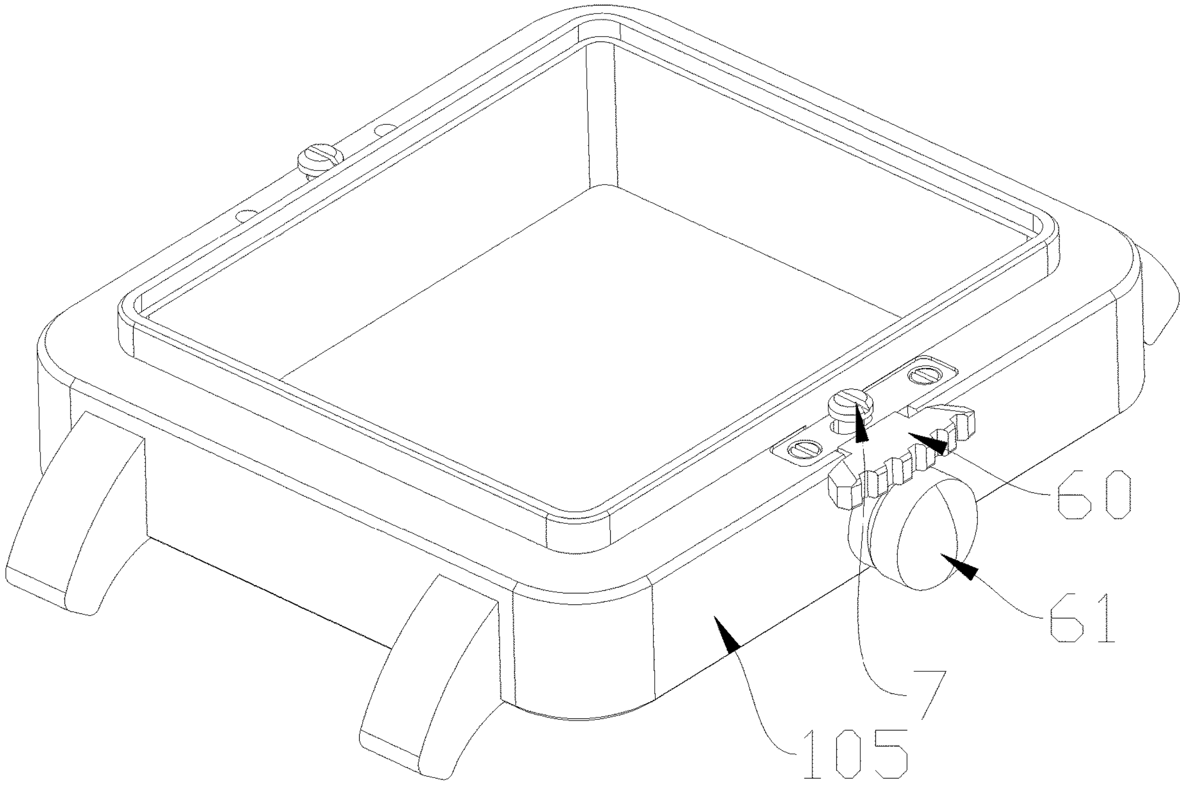
FIG. 11 is a schematic view of the clamp member with a knob of the watchcase of FIG. 1.
Figure 12:
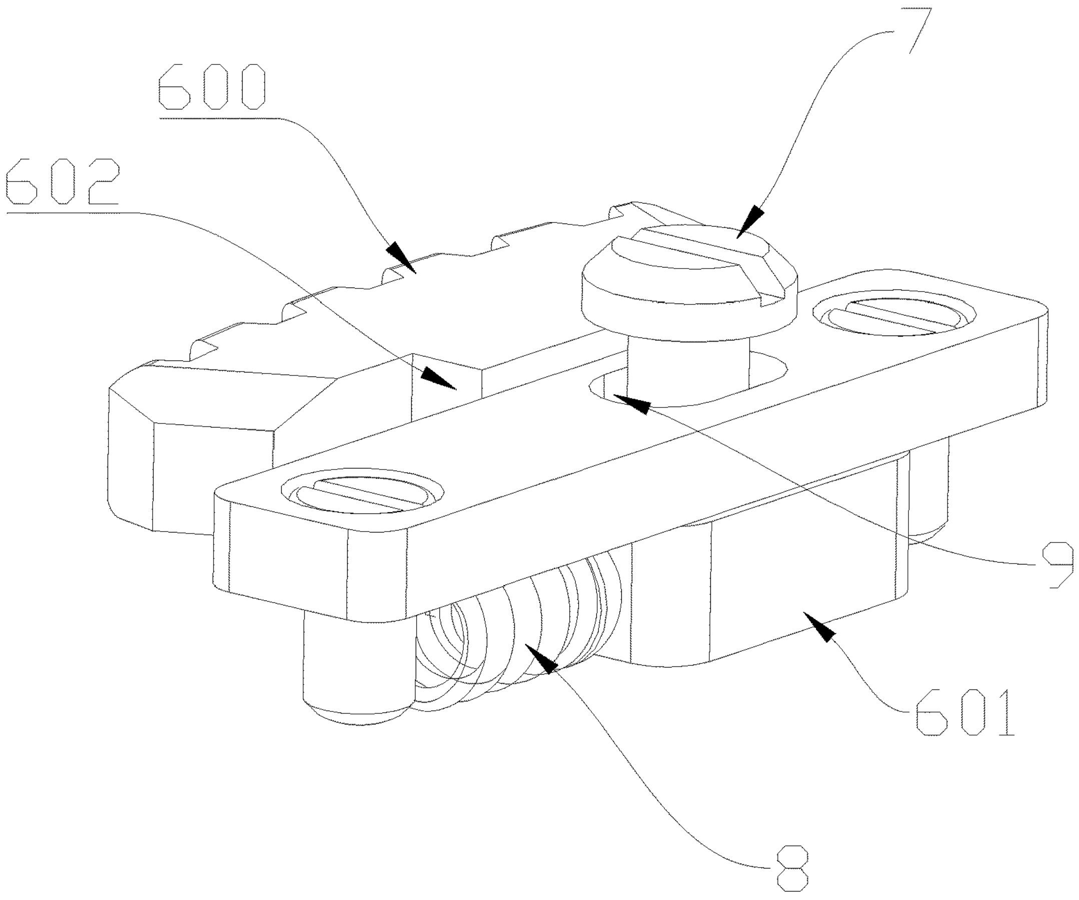
FIG. 12 is a schematic view of a key, a clamping portion and an elastic member of the watchcase of FIG. 1.
Figure 13:
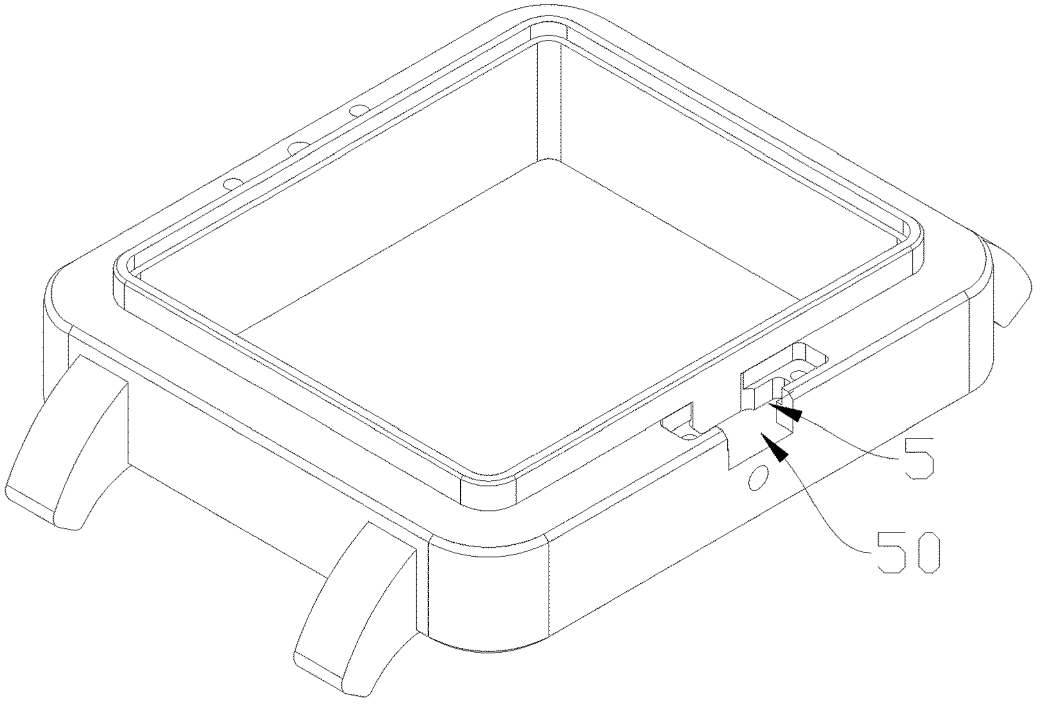
FIG. 13 is a partial schematic view of the watchcase of FIG. 1.
Figure 14:
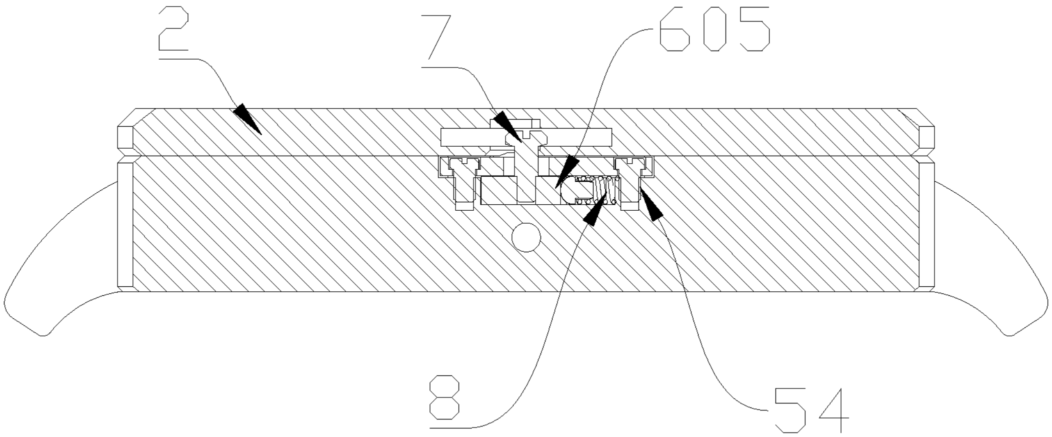
FIG. 14 is a partial cross-sectional view of the watchcase of FIG. 1.
Figure 15:
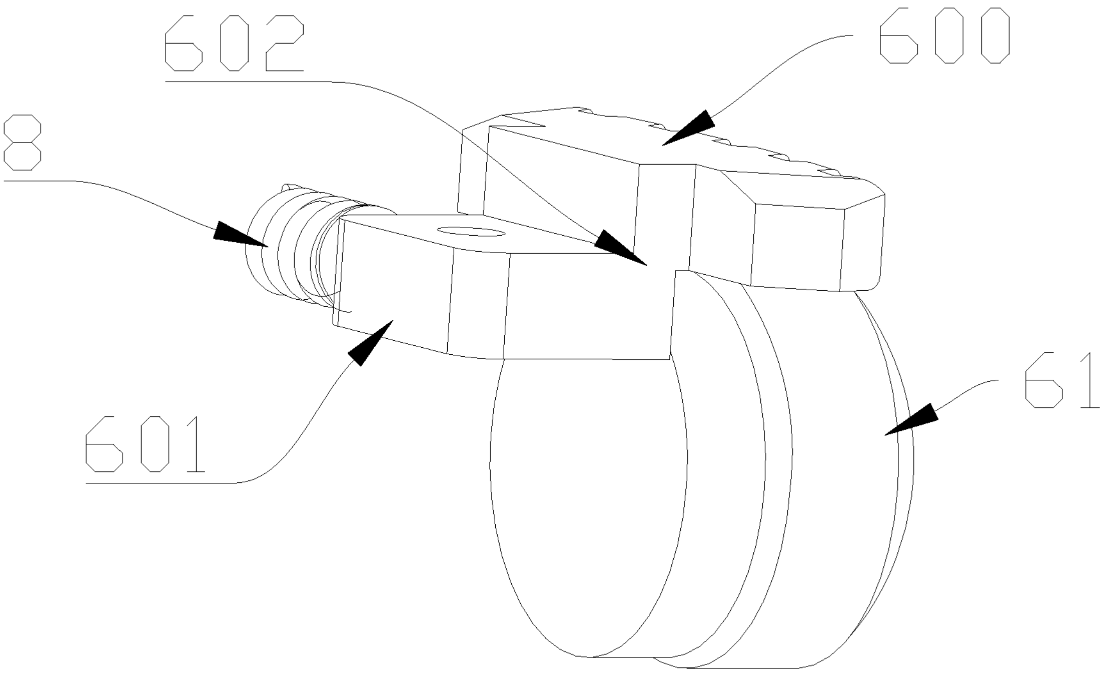
FIG. 15 is a partial schematic view of the watchcase of FIG. 1.

Referring to FIGS. 1-15, a watchcase 1 with a detachable bezel 2 according to an embodiment of the present disclosure is provided. A bottom of the watchcase 1 is sealed by a bottom cover 102, and a top of the watchcase 1 is sealed by a top cover 101 so that a receiving space is formed to install movements and other structures. A subsequent description of directions in the present disclosure, such as terms "facing inward", "inner" and "inner end" refer to the inside of the watchcase where the movement is installed, while terms "facing outward", "outer" and "outer end" refer to a direction towards the outside of the watchcase. The bezel 2 is detachably installed on an upper end 100 of the watchcase 1 and surrounds around the top cover 101. The watchcase 1 includes two or more clamping members 4, and the bezel 2 includes two or more slots 3 that are respectively matched with the two or more clamping members 4, that is, the number of slots 3 corresponds to the number of clamping members 4. Each clamping member 4 includes an operation member 6, a clamping portion 7 and an elastic member 8.

The elastic member 8 can be a compression spring, and the operation member 6 is connected to the clamping portion 7. The elastic member 8 acts on the clamping portion 7 to lock the clamping portion 7 in the corresponding slot 3, and the operation member 6 controls a movement of the clamping portion 7 to detach from the slot 3.

Under normal conditions, the elastic member 8 directly or indirectly applies an elastic force on the clamping portion 7, causing the clamping portion 7 to be locked in the slot 3 to further lock the bezel 2 onto the watchcase 1. When it is needed to unlock the clamping portion 7, a force is applied on the operation member 6 to detach the clamping portion 7 from the slot 3. There are preferably two clamping members 4, and two corresponding slots 3 are arranged on the bezel 2. The two clamping members 4 are radially opposite to each other and arranged on both sides of the watchcase 1, to form two relatively symmetrical buckle points that can generate stable and balance connection forces and conveniently unlock the clamping portion 7. The clamping member 4 is provided that a shape of the watchcase 1 is not limited to be circular, so that square or other irregular shapes of the watchcase 1 can be set.

In some embodiments of the present disclosure, the operation member 6 of one of the at least two clamping members 4 includes a movable key 60 installed in a receiving room 5 that is arranged on a side wall 104 of the watchcase 1, an operation window 50 arranged on an outer end 51 of the receiving room 5 so that the key 61 passes through the receiving room 5 and extends out of the watchcase 1, a lower portion 70 of the clamping portion 7 connected to the key 60, and an upper portion 71 of the clamping portion 7 extending upwards to fit with the slot 3, the elastic member 8 arranged between the key 60 and the receiving room 5.

Under normal conditions, the elastic member 8 acts on the clamping portion 7 through the key 60 to keep the clamping portion 7 in a locked state. And the key 60 is exposed through the operation window 50, which allows a force to apply on the key 60. When unlocking the clamping portion 7, the force is applied on the key 60 to move the key 60 and then drive the clamping portion 7 to synchronously move along the slot 3 until the clamping portion 7 moves to an unlocking position.

In some embodiments of the present disclosure, the receiving room 5 includes an upper side 51 with a through-hole 9 thereof, the clamping portion 7 passing through the through-hole 9, and the through-hole 9 having a space 90 to adapt to a movement of the clamping portion 7.

In some embodiments of the present disclosure, the scheme of the press-type key 60 with the clamping member 4 is provided. Specifically, the key 60 is pressed inwards to be installed in the receiving room 5 and includes an insertion chamber 603, one end of the elastic member 8 inserted into the insertion chamber 603, and the other end of the elastic member 8 extending out of the insertion chamber 603 and abut against an inner wall 53 of the receiving room 5. The slot 3 corresponding to the clamping member 4 is horizontally arranged on a bottom surface 200 of the bezel 2, a locking end 30 of the clamping portion 7 is locked outwardly, and an unlocking end 31 of the clamping portion 7 passes inwardly therethrough. The watchcase 1 includes a vertical limiting rod 11 and a limiting hole 604 arranged on the key 60, the limiting rod 11 inserted into the limiting hole 604, and the limiting hole 604 defining a headspace 6041, which means that an inner diameter of the limiting hole 604 is greater than a diameter of the limiting rod 11. The limiting rod 11 can move radially within the limiting hole 604, so as to press the key 60.

The key 60 can be pressed inward and installed in the receiving room 5. The limiting rod 11 of the watchcase 1 is inserted into the limiting hole 604 of the key 60, which can not only limit the key 60 in the receiving room 5, but also can guide the key 60 to move in the receiving room 5. Under normal conditions, the elastic member 8 pushes the key 60 outwardly to cause the clamping portion 7 to be limited by the locking end 30; when the clamping portion 7 is unlocked, a force is applied to press the key 60 that is exposed to the outside of the operation window 50, and the key 60 together with the clamping portion 7 move inward so that the clamping portion 7 moves along the slot 3 until the clamping portion 7 moves to the unlocking end 31. After the clamping portion 7 is unlocked, the bezel 2 can be separated from the watchcase 1. During installing the watchcase 1, the key 60 is pressed to allow the clamping portion 7 to enter the slot 3, and then the pressing force releases, at this time, the elastic member 8 is released to reset the key 60 and the clamping portion 7 to a locked state thereof.

In some embodiments of the present disclosure, the scheme of the press-type key 60 with the clamping member 4 is provided. Specifically, the watchcase 1 includes a crown 61, and the receiving room 5 arranged above the crown 61. The key 60 includes a knob 600, and a base 601 received in the receiving room 5, the clamping portion 7 arranged on the base 601; the knob 600 exposed through the operation window 50, and a connecting portion 602 formed between the knob 600 and the base 601 being in a bent-shaped structure, and the crown 61 arranged below the connecting portion 602. The connecting point 602 can be manufactured into an L-shaped structure by a computer numerical control (CNC) device, which is bent and forms a space for installing the crown 61, and conducive to maintaining a compact installation of the structure thereof and avoiding an excessive space occupation by the structure. When unlocking, the base 601 is controlled to move in the receiving room 5 by applying the force on the knob 600, thereby driving the clamping portion 7 to move in the slot 3.

Furthermore, in the scheme that the clamping member 4 with the knob 600, an extension direction of the locking end 30 and the unlocking end 31 of the slot 3 is consistent with a length direction of a side 201 of the bezel 2, and a movement direction of the key 60 is consistent with the length direction of a side edge 105 of the watchcase 1. The elastic member 8 is supported between an end portion 605 of the key 60 and a corresponding end wall 54 of the receiving room 5. That is, the knob 600 moves along the length direction of the side edge 105 of the watchcase 1. In the embodiment of the present disclosure, the movement direction of the key 60 is consistent with the length direction of the side edge 105 of the watchcase 1, while in the previous embodiment of the present disclosure, the movement direction of the key 60 is along an inward and outward direction relative to the watchcase 1.

In some embodiments of the present disclosure, the scheme of the clamping member 4 with the crown 61 is provided. Specifically, the operation member 6 of one of the at least two clamping members 4 includes the crown 61 and a corresponding slide block 62. A sliding chamber 10 is formed at a side wall of the watchcase 1, and the slide block 62 is installed in the sliding chamber 10, the lower portion 70 of the clamping portion 7 connected to the slide block 62, and the upper portion 71 of the clamping portion 7 extending upwards to fit with the corresponding slot 3. In the slot 3 that is corresponding to the clamping member 4, an outer portion of the slot 3 is taken as the locking end 30, and an inner portion of the slot 30 is taken as the unlocking end 31. The slide block 62 is pushed inwards to be unlocked by pressing the crown 61, and the elastic member 8 is arranged between an inner wall of the slide block 62 and an inner wall of the sliding chamber 10.

The crown 61 is a commonly configured component of the conventional watchcase 1, which can be pulled out for a short stroke and then rotates to adjust a time and a calendar. The crown 61 is designed to be pressed inwardly, and then the slide block 62 is driven to drive the clamping portion 7 to move along the slot 3 inwardly to unlock the clamping portion 7. Under normal conditions, the elastic member 8 abuts against the slide block 62 outwardly, so as to limit the clamping portion 7 by the locking end 30.

In some embodiments of the present disclosure, in the scheme that the clamping member 4 is unlocked by pressing the crown 61, the crown 61 includes a seat 63 installed on the watchcase 1, and a hat 611 covered at the outer of the seat 63 and moving axially relative to the seat 63, and the hat 611 including a triggering portion 610 corresponding to the slide block 62. The sliding chamber 10 is provided with a window 100 for the triggering portion 610 to come into contact with the sliding block 62, and the triggering portion 610 can be a protrusion formed on the inner side of the hat 611. A hole can be set on the side wall of the watchcase 1, and the seat 63, with one end being exposed, is inserted into the hole, the hat 611 covers on the exposed end of the seat 63. When a force is applied, the hat 611 moves inwardly along an axis of the seat 63, the triggering portion 610 pushes the slide block 62 through the window 100, to drive the clamping portion 7 to move synchronously.

Furthermore, the seat 63 includes an inner chamber 630 axially penetrating the seat 63; the inner wall of the hat 611 is connected to a tubular portion 64 penetrating through the inner chamber 630, and an end of the tubular portion 64 that is away from the hat 611 is connected to a handle 65. An outer end of the handle 65 is inserted into the tubular portion 64. The tubular portion 64 includes a first flange 66, and the handle 65 includes a second flange 660, the first flange 66 abut against an end of the second flange 660 near to the inner of the watchcase 1, so as to prevent the handle 65 from detaching from the tubular portion 64. A hole formed in the middle of the tubular portion 64 is polygonal, and the handle 65 inserted into the hole of the tubular portion 64 is in a corresponding multi-prism shape, in this way, the tubular portion 64 can drive the handle 65 to rotate coaxially. A spring 67 is received in the tubular portion 64, and both ends of the spring 67 respectively abut against the hat 611 and the handle 65, so as to assist in resetting the hat 611. Generally, the handle 65 is a component connected to the movement of a watch, and the movement of the watch can be adjusted through the handle 65 by operating the hat 611. The tubular portion 64 of the hat 611 can be sleeved with the handle 65 through a hexagonal prism structure to avoid relative rotation therebetween. At the same time, the tubular portion 64 includes the first flange 66 and the handle 65 includes the second flange 660, thereby the tubular portion 64 and the handle 65 can be clamped with each other by the first flange 66 engaging with the second flange 660. When pressing the hat 611 inwardly, the handle 65 is not affected. When pulling out the crown 61 outwardly, the handle 65 can be pulled out through the first flange 66 and the second flange 660 according to a preset stroke, so as to implement adjustment functions of regular time and calendars.

In some embodiments of the present disclosure, a marble 103 is installed on the watchcase 1, and abuts against the bottom surface 200 of the bezel 2, to avoid looseness caused by a gap formed between the bezel 2 and the watchcase 1.

In the aforementioned embodiments of the present disclosure, the clamping portion 7 can be a screw that includes a rod body and a screw head with a size larger than that of the rod body, while a locking groove includes a groove cavity for accommodating the screw head therein. A bottom of the groove cavity is provided with a groove for the screw body to travel there-along. A size of a groove of the unlocking end 31 is large to be used for the screw head vertically passing therethrough, while, a size of a groove of the locking end 30 is small, so that the rod body of the screw can travel there-along, but the screw head can't enter or exit.

Preferably, the two clamping members 4 of the watchcase 1 can be same or different. Taking the scheme of the clamping member 4 with the press-type key 60, the scheme of the clamping member 4 with the knob 600, and the scheme that the clamping member 4 is unlocked by pressing the crown 61 of the present disclosure as examples, the two clamping members 4 of the watchcase 1 can be set by selecting one or two of the aforementioned three schemes. For example, one of the two clamping members 4 on the watchcase 1 is a buckle structure scheme with the press-type key 60, while the other clamping member 4 is a buckle structure scheme with the knob 600 or a buckle structure scheme unlocked by pressing the crown 61. Selecting one of the two clamping members 4 as the buckle structure scheme with the press-type key 60, and the other clamping member as the buckle structure scheme that can be unlocked by pressing the crown 61. Firstly, the conventional crown 61 is used to reduce changes in an appearance of the watchcase 1, at the same time, the watchcase 1 can be unlocked by simultaneously pressing the crown 61 through a thumb and an index finger, which is easy to operate and more ergonomic.

A watch according to an embodiment of the present disclosure includes a watchcase with a detachable bezel as described in the above contents.

In summary, the improved watchcase 1 and the bezel 2 are detachably disassembled and assembled through the clamping member 4, which has strong applicability and is easy to be operated.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A watchcase with a detachable bezel detachably installed on an upper end of the watchcase, comprising:
   - at least two clamping members, and the bezel comprises at least two slots corresponding to engage with the at least two clamping members; and wherein
   - each of the at least two clamping members comprises a clamping portion, an elastic member applied to lock the clamping portion in the corresponding slot, and an operation member connected to the clamping portion and controlling the clamping portion to move so as to detach the clamping portion from the slot;
   - wherein the operation member of a first one of the at least two clamping members comprises a crown and a corresponding slide block;
   - a sliding chamber is formed at a first side wall of the watchcase, and the slide block is installed in the sliding chamber, the lower portion of the clamping portion of the first one of the at least two clamping members is connected to the slide block, and the upper portion of the clamping portion of the first one of the at least two clamping members extends upwards to fit with the corresponding slot; and the slide block is pushed inwards to be unlocked by pressing the crown, and the elastic member of the first one of the at least two clamping members is arranged between an inner wall of the slide block and an inner wall of the sliding chamber.

2. The watchcase as claimed in claim 1, wherein the operation member of a second one of the at least two clamping members comprises a movable key installed in a receiving room that is arranged on a second side wall of the watchcase, an operation window arranged on an outer end of the receiving room so that the key passes through the receiving room and extends out of the watchcase, a lower portion of the clamping portion of the second one of the at least two clamping members is connected to the key, and an upper portion of the clamping portion of the second one of the at least two clamping members extends upwards to fit with the slot, and the elastic member of the second one of the at least two clamping members is arranged between the key and the receiving room.

3. The watchcase as claimed in claim 2, wherein the receiving room comprises an upper side with a through-hole thereof, wherein the clamping portion of the second one of the at least two clamping members passes through the through-hole, and the through-hole has a space to adapt to a movement of the clamping portion of the second one of the at least two clamping members.

4. The watchcase as claimed in claim 2, wherein the key is pressed inwards to be installed in the receiving room and comprises an insertion chamber, one end of the elastic member of the first one of the at least two clamping members is inserted into the insertion chamber, and the other end of the elastic member of the first one of the at least two clamping members extends out of the insertion chamber and abuts against an inner wall of the receiving room;

the slot corresponding to the clamping member is horizontally arranged on a bottom surface of the bezel, an outer portion of the slot is taken as a locking end, and an inner portion of the slot is taken as an unlocking end; and the watchcase comprises a vertical limiting rod and a limiting hole arranged on the key, the limiting rod is inserted into the limiting hole, and the limiting hole defines a headspace to move the limiting rod therein, so as to adapt to a pressing action of the key.

5. The watchcase as claimed in claim 1, wherein the crown comprises a seat installed on the watchcase and a hat; wherein the hat is covered at the outer of the seat and moves axially relative to the seat, and the hat comprises a triggering portion corresponding to the slide block.

6. The watchcase as claimed in claim 5, wherein the seat comprises an inner chamber axially penetrating the seat;

the inner wall of the hat is connected to a tubular portion penetrating through the inner chamber, and an end of the tubular portion that is away from the hat is connected to a handle; and a spring is received in the tubular portion, and both ends of the spring respectively abut against the hat and the handle.

7. The watchcase as claimed in claim 1, wherein a marble is installed on the watchcase to abut against a bottom surface of the bezel.

8. A watch comprising a watchcase with a detachable bezel as claimed in claim 1.

* * * * *